(12) United States Patent
Zhong

(10) Patent No.: US 9,874,790 B2
(45) Date of Patent: Jan. 23, 2018

(54) PIXEL ELECTRODE AND LIQUID CRYSTAL DISPLAY PANEL

(71) Applicant: Shenzhen China Star Optoelectronics Technology Co. Ltd., Shenzhen (CN)

(72) Inventor: Xinhui Zhong, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 209 days.

(21) Appl. No.: 14/781,583

(22) PCT Filed: Aug. 21, 2015

(86) PCT No.: PCT/CN2015/087719
§ 371 (c)(1),
(2) Date: Sep. 30, 2015

(87) PCT Pub. No.: WO2017/020352
PCT Pub. Date: Feb. 9, 2017

(65) Prior Publication Data
US 2017/0153506 A1    Jun. 1, 2017

(30) Foreign Application Priority Data

Aug. 3, 2015 (CN) .......................... 2015 1 0484328

(51) Int. Cl.
*G02F 1/1343* (2006.01)
*G02F 1/1362* (2006.01)
*G02F 1/1368* (2006.01)

(52) U.S. Cl.
CPC ...... *G02F 1/134309* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS 8,610,854 B2 * 12/2013 Zhang ................... G02F 1/1333
349/129
8,941,572 B2 * 1/2015 Nam ................. G02F 1/136286
345/92

(Continued)

FOREIGN PATENT DOCUMENTS

CN    101782704 A    7/2010

*Primary Examiner* — Ryan Crockett
(74) *Attorney, Agent, or Firm* — Leong C. Lei

(57) ABSTRACT

The invention provides a pixel electrode and a liquid crystal display panel. The pixel electrode does not contain a "cross-shaped" keel structure and specifically includes: a peripheral border (40), and multiple first, second, third and fourth pixel electrode branches (41, 42, 43, 44) being strip-shaped. The multiple first, second, third and fourth strip-shaped pixel electrode branches (41, 42, 43, 44) all are disposed in the interior of the peripheral border (40) and connected to the peripheral border (40) and further form an asymmetric structures, so that most of liquid crystal molecules located in the middle of the pixel electrode would be orientated along directions of spacings among the pixel electrode branches, the problem of low penetration rate of the liquid crystal display panel in the prior art caused by the "cross-shaped" keel structure of the pixel electrode can be solved and the transmittance can be increased.

7 Claims, 9 Drawing Sheets

(52) U.S. Cl.
CPC .. *G02F 1/136286* (2013.01); *G02F 2201/121* (2013.01); *G02F 2201/123* (2013.01)

(56) References Cited

U.S. PATENT DOCUMENTS

| | | | |
|---|---|---|---|
| 2008/0007681 A1* | 1/2008 | Chen | G02F 1/133707 349/129 |
| 2010/0182521 A1* | 7/2010 | Inoue | G02F 1/134336 349/33 |
| 2012/0307190 A1* | 12/2012 | Zhang | G02F 1/133707 349/142 |
| 2013/0093984 A1* | 4/2013 | Hou | G02F 1/134336 349/106 |
| 2015/0192833 A1* | 7/2015 | Ono | G02F 1/136213 349/41 |
| 2016/0147119 A1* | 5/2016 | Chang | G09G 3/3648 349/33 |

* cited by examiner

PIXEL ELECTRODE AND LIQUID CRYSTAL DISPLAY PANEL

TECHNICAL FIELD

The invention relates to the display field, and particularly to a pixel electrode and a liquid crystal display panel.

DESCRIPTION OF RELATED ART

In recent years, active-type thin film transistor liquid crystal display (TFT-LCD) devices have been rapidly developed and widely used. Nowadays, TFT-LCD display panels on the mainstream market could be divided into three types respectively being a twisted nematic (TN) or super twisted nematic (STN) type, an in-plane switching (IPS) type and a vertical alignment (VA) type. A VA-type liquid crystal display device has a higher contrast relative to other types of liquid crystal display devices, which could generally reach to 4000-8000, and have a wide application in a large-sized displaying field such as televisions.

The reason that the VA-type liquid crystal display panel has a very high contrast is that liquid crystal molecules are aligned perpendicular to a substrate surface in a dark state of being not applied with a voltage and thus there is no phase difference is produced, the light leakage is extremely low and the dark state brightness is very small. According to a contrast calculation formula, the lower the dark state brightness is, the higher the contrast is. In order to make the liquid crystal molecules in the VA-type liquid crystal display panel be aligned perpendicular to the substrate surface, the liquid crystal molecules are needed to be vertically aligned, and the most common practice is that: coating with a vertical alignment agent in particular regions of surfaces of an upper substrate and a lower substrate and the vertical alignment agent generally including a large amount of chemical solvent NMP (N-methylpyrrolidone) and polymer materials such as polyimide (PI); then baking the substrates at a high temperature (typically over 200 degrees Celsius) for a long time to make the solvent in the alignment agent be dried and thereby forming PI alignment layers on the surfaces of the substrates. Referring to FIG. 1, a conventional VA-type liquid crystal display panel includes: an upper substrate 10, a lower substrate 20 disposed opposite to the upper substrate 10, a liquid crystal layer 50 sandwiched between the upper substrate 10 and the lower substrate 20, and PI alignment layers 30 formed on a surface of a side of the upper substrate 10 facing towards the lower substrate 20 and a surface of a side of the lower substrate 20 facing towards the upper substrate 10. Owing to the VA-type liquid crystal display panel using liquid crystals of vertical rotation, a birefringence of liquid crystal molecules has a relatively large difference, which causes a serious color shift problem in a large viewing angle.

In order to make the VA-type liquid crystal display panel achieve better wide viewing angle property and improve the color shift problem, a multi-domain VA (MVA) technology is usually used, that is, a sub-pixel is divided into multiple domains and liquid crystals in respective domains are orientated to different directions when a voltage is applied thereto, so that the effects viewed from different directions tend to be average and consistent. Methods for realizing the MVA technology have many kinds, please refer to FIG. 2, FIG. 3 and FIG. 4, one method is that: a ITO pixel electrode 70 of one side is treated to be a pozidriv pattern, a common electrode 80 is a continuous planar electrode with uniform thickness, owing to the special pattern of the ITO pixel electrode, inclined electric field as generated would induce the liquid crystal molecules 50 in different domains to align along different directions.

FIG. 2 is a schematic top plan view of a side of the lower substrate 20 of a MVA-type liquid crystal display panel, 210 and 220 respectively represent a scan line and a data line, one sub-pixel is divided into four regions by the pixel electrode 70. The ITO pixel electrode 70 includes a "cross-shaped" keel structure 701, pixel electrode branches 702 respectively extended along directions of 45°, 135°, −45° and −135° from the "cross-shaped" keel structure 701 with respect to a horizontal direction and a pattern of slit spacings. FIG. 3 is a schematic cross-sectional view of the MVA-type liquid crystal display panel taken along line A-A in FIG. 2, the ITO pixel electrode 70 having slits is disposed on a flat lower passivation layer 60, the planar common electrode 80 is disposed on a flat upper passivation layer 90, the PI alignment layers 30 are covered on the pixel electrode 70 and the common electrode 80.

According to a transmittance formula of the VA-type liquid crystal display panel:

$$T = \frac{1}{2}\sin^2 2\Delta\Phi \sin^2 \frac{\Gamma}{2} \quad \text{(formula 1)}$$

Where T represents the transmittance, $\Delta\Phi$ represents an intersection angle between a long axis of liquid crystal and a polarizer, and the efficiency is the highest when the intersection angle is 45°; $\Gamma$ represents a phase difference, that is a modulation effect of a polarized light modulated by the liquid crystal molecules driven by an electric field.

A calculation formula of $\Gamma$ is:

$$\Gamma = \cos(a) * 2\pi * \Delta n * d/\lambda \quad \text{(formula 2)}$$

Where a represents an intersection angle between the long axis of liquid crystal molecule and a normal line of substrate and its magnitude is determined by an electric field by which the liquid crystal molecules are driven, d represents a cell thickness of a liquid crystal cell, $\Delta n$ represents a refractive index difference between a long axis and a short axis of liquid crystal.

It is seen from the above transmittance formula that, in the four regions of the sub-pixel, the ITO pixel electrode 70 has the pixel electrode branches 702 respectively extended along directions of 45°, 135°, −45°, and −135° with respect to the horizontal direction and the pattern of slit spacings (the directions of an upper polarizer and a lower polarizer respectively are 0° and 90°), the long axes of liquid crystal molecules would be orientated along the inclined directions of 45°, 135°, −45°, and −135° with respect to the horizontal direction, and the $\sin^2 2\Delta\Phi$ in the transmittance formula is equal to 1, and therefore the transmittance can be maximized.

However, liquid crystal molecules 50 in a region corresponding to the "cross-shaped" keel structure 701 of the pixel electrode 40 as shown in FIG. 2 often do not be orientated along the inclined directions of 45°, 135°, −45°, and −135° with respect to the horizontal direction like the liquid crystal molecules in the region corresponding to the pixel electrode branches 702 and the pattern of slit spacings, but as shown in FIG. 5, the liquid crystal molecules 50 located in the region corresponding to the "cross-shaped" keel structure 701 are orientated along a direction of 0° or 90° with respect to the horizontal direction, the $\sin^2 2\Delta\Phi$ in the transmittance formula is equal to 0, resulting in displaying a non-transparent state, so that the entire transmittance of the liquid crystal display panel is reduced about 10% compared with an ideal situation (the liquid crystal molecules completely are orientated along the inclined direction of 45°).

SUMMARY

Accordingly, an objective of the invention is to provide a pixel electrode, so as to solve the problem of low transmittance of liquid crystal display panel in the prior art caused by the "cross-shaped" keel structure of the pixel electrode, improve the transmittance of liquid crystal display panel, lower the requirement of backlight brightness for liquid crystal display panel and reduce power consumption.

Another objective of the invention is to provide a liquid crystal display panel, which may achieve high transmittance, low demand for backlight brightness and low power consumption.

In order to achieve the above-mentioned objectives, the invention provides a pixel electrode including: a peripheral border, a plurality of first pixel electrode branches disposed parallel to and spaced from each other, a plurality of second pixel electrode branches disposed parallel to and spaced from each other, a plurality of third pixel electrode branches disposed parallel to and spaced from each other and a plurality of fourth pixel electrode branches disposed parallel to and spaced from each other.

The plurality of first pixel electrode branches, the plurality of second pixel electrode branches, the plurality of third pixel branches and the plurality of fourth pixel branches all are disposed in the interior of the peripheral border and connected to the peripheral border. The plurality of first pixel electrode branches and the plurality of second pixel electrode branches are not symmetrical with respect to a vertical centerline of the peripheral border and arranged staggeredly up and down along a vertical direction. The plurality of third pixel electrode branches and the plurality of fourth pixel electrode branches are not symmetrical with respect to the vertical centerline of the peripheral border and arranged staggeredly up and down along the vertical direction. The plurality of first pixel electrode branches and the plurality of fourth pixel electrode branches are not symmetrical with respect to a horizontal centerline of the peripheral border. The plurality of second pixel electrode branches and the plurality of third pixel electrode branches are not symmetrical with respect to the horizontal centerline of the peripheral border.

In one embodiment, an end of any one of the plurality of first pixel electrode branches, the plurality of second pixel electrode branches, the plurality of third pixel electrode branches and the plurality of fourth pixel electrode branches relatively far away from the peripheral border is not connected with the end of any one of the other pixel electrode branches.

In one embodiment, the plurality of first pixel electrode branches, the plurality of second pixel electrode branches, the plurality of third pixel electrode branches and the plurality of fourth pixel electrode branches each have a strip shape.

In one embodiment, the plurality of first pixel electrode branches, the plurality of second pixel electrode branches, the plurality of third pixel electrode branches and the plurality of fourth pixel electrode branches respectively are inclined 45°, 135°, −135° and −45° with respect to a horizontal direction.

In one embodiment, the peripheral border has a rectangular shape.

In one embodiment, the peripheral border is a closed ring structure constituted by a first vertical side, a second vertical side, a first horizontal side and a second horizontal side. The first vertical side and the second vertical side both are disposed along a vertical direction. The first horizontal side and the second horizontal side both are disposed along a horizontal direction.

A part of the plurality of first pixel electrode branches are connected to the first vertical side and the other part of the plurality of first pixel electrode branches are connected to the first horizontal side. A part of the plurality of second pixel electrode branches are connected to the second vertical side and the other part of the plurality of second pixel electrode branches are connected to the first horizontal side. A part of the plurality of third pixel electrode branches are connected to the second vertical side and the other part of the plurality of third pixel electrode branches are connected to the second horizontal side. A part of the plurality of fourth pixel electrode branches are connected to the first vertical side and the other part of the plurality of fourth pixel electrode branches are connected to the second horizontal side.

In one embodiment, a material of the pixel electrode is ITO (indium tin oxide).

The invention further provides a liquid crystal display panel including: an upper substrate, a lower substrate disposed opposite to the upper substrate, a common electrode disposed on a side of the upper substrate facing toward the lower substrate, a pixel electrode disposed on a side of the lower substrate facing toward the upper substrate, and a liquid crystal layer interposed between the common electrode and the pixel electrode.

The lower substrate includes a gate line extending along a horizontal direction, a data line extending along a vertical direction, and a thin film transistor. A gate of the thin film transistor is connected to the gate line, a source of the thin film transistor is connected to the data line, and a drain of the thin film transistor is connected to the pixel electrode.

The pixel electrode is anyone of pixel electrodes provided by the invention as described above.

The invention still further provides a pixel electrode including: a peripheral border, a plurality of first pixel electrode branches disposed parallel to and spaced from each other, a plurality of second pixel electrode branches disposed parallel to and spaced from each other, a plurality of third pixel electrode branches disposed parallel to and spaced from each other and a plurality of fourth pixel electrode branches disposed parallel to and spaced from each other.

The plurality of first pixel electrode branches, the plurality of second pixel electrode branches, the plurality of third pixel branches and the plurality of fourth pixel branches all are disposed in the interior of the peripheral border and connected to the peripheral border. The plurality of first pixel electrode branches and the plurality of second pixel electrode branches are not symmetrical with respect to a vertical centerline of the peripheral border and arranged staggeredly up and down along a vertical direction. The plurality of third pixel electrode branches and the plurality of fourth pixel electrode branches are not symmetrical with respect to the vertical centerline of the peripheral border and arranged staggeredly up and down along the vertical direction. The plurality of first pixel electrode branches and the plurality of fourth pixel electrode branches are not symmetrical with respect to a horizontal centerline of the peripheral border. The plurality of second pixel electrode branches and the plurality of third pixel electrode branches are not symmetrical with respect to the horizontal centerline of the peripheral border.

An end of any one of the plurality of first pixel electrode branches, the plurality of second pixel electrode branches, the plurality of third pixel electrode branches and the plurality of fourth pixel electrode branches relatively far away from the peripheral border is not connected with the end of any one of the other pixel electrode branches.

The plurality of first pixel electrode branches, the plurality of second pixel electrode branches, the plurality of third pixel electrode branches and the plurality of fourth pixel electrode branches each are strip-shaped.

The peripheral border has a rectangular shape.

Beneficial effects of the invention are that: in regard to the pixel electrode and the liquid crystal display panel provided by the invention, the pixel electrode does not contain the "cross-shaped" keel structure like the prior art, multiple pixel electrode branches are connected by the peripheral border and the multiple pixel electrode branches forms an asymmetric structure, so that most of liquid crystal molecules located in the middle portion of the pixel electrode are orientated along directions of spacings among the pixel electrode branches, the problem of low transmittance of the liquid crystal display panel in the prior art caused by that the liquid crystal molecules located at the "cross-shaped" keel structure are improperly orientated can be solved, the transmittance of the liquid crystal display panel can be increased, the requirement of backlight brightness for the liquid crystal display panel can be lowered, and the power consumption can be reduced.

In order to further understand features and technical contents of the invention, please refer to following detailed description and accompanying drawings of the invention. The drawings only are used for providing reference and description and are not intended to limit the invention.

BRIEF DESCRIPTION OF THE DRAWINGS

In the following, with reference to accompanying drawings, concrete embodiments of the invention will be described in detail to make technical solutions and other beneficial effects of the invention more clear. In the drawings.

DETAILED DESCRIPTION OF EMBODIMENTS

In order to further illustrate technical solutions and other beneficial effects taken by the invention, in the following, with reference to preferred embodiments and accompanying drawings of the invention, the technical solutions and other beneficial effects will be clearly and completely described.

Figure 1:
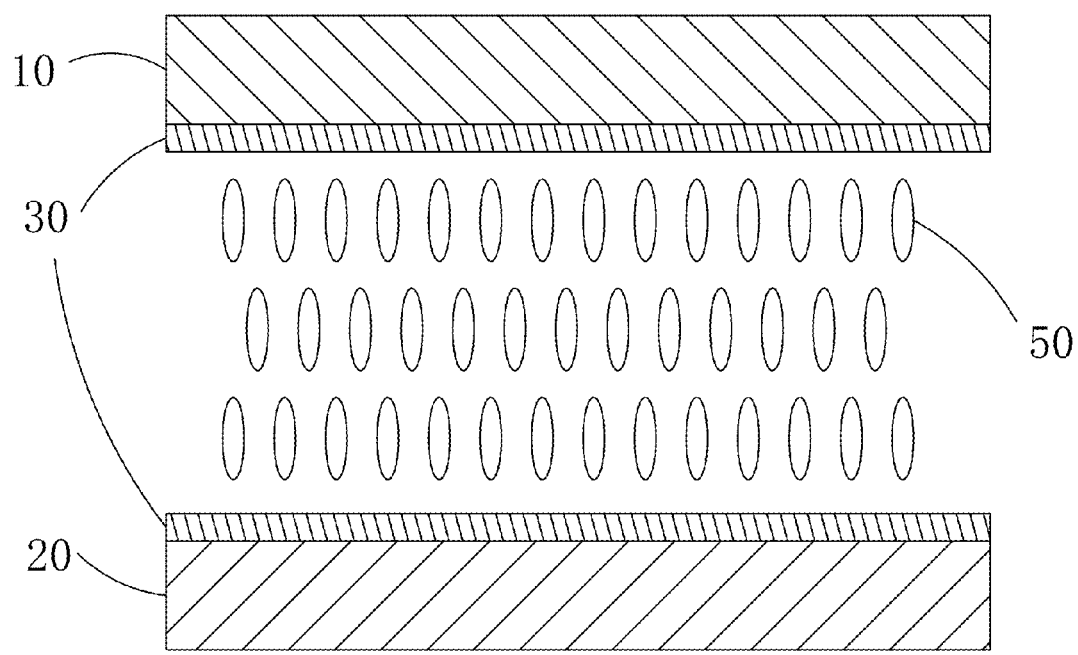
FIG. 1 is a schematic cross-sectional view of a conventional VA-type liquid crystal display panel.
Figure 2:
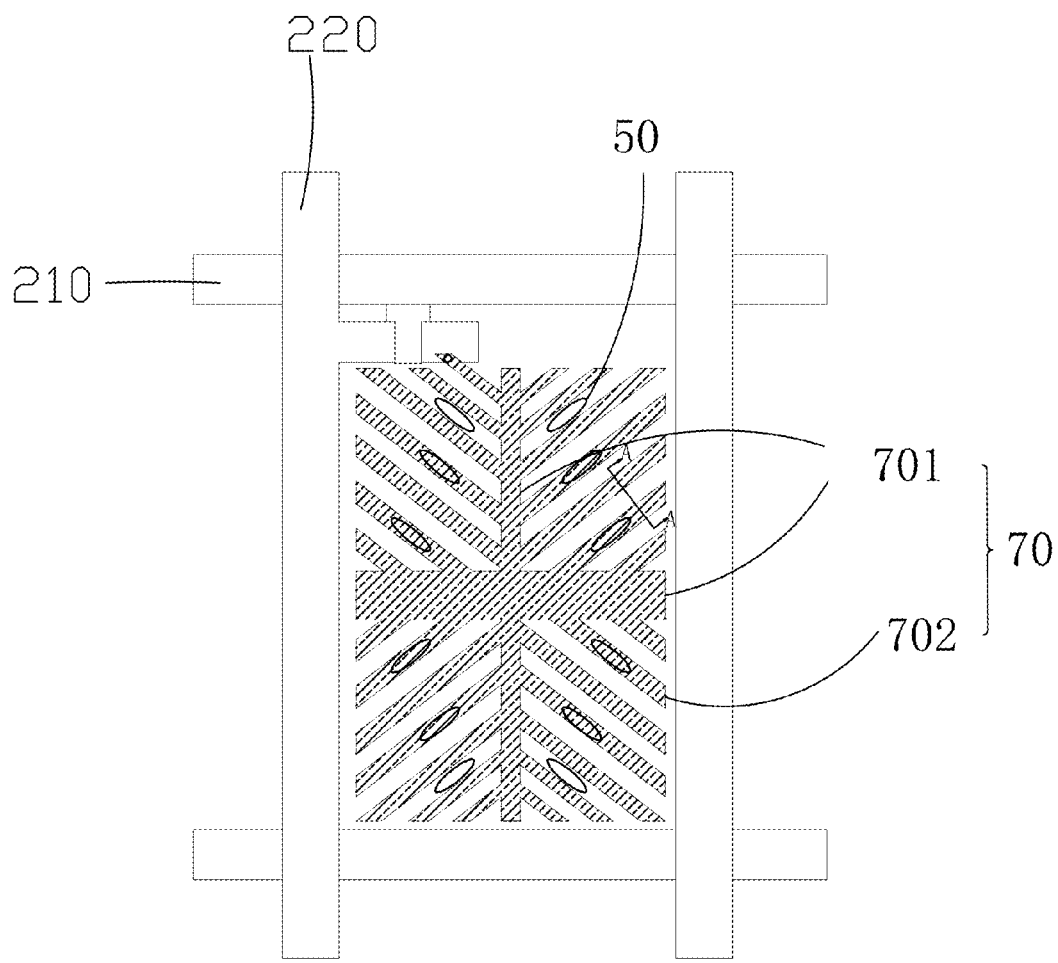
FIG. 2 is a schematic top plan view of a side of a lower substrate of a conventional MVA-type liquid crystal display panel.
Figure 3:
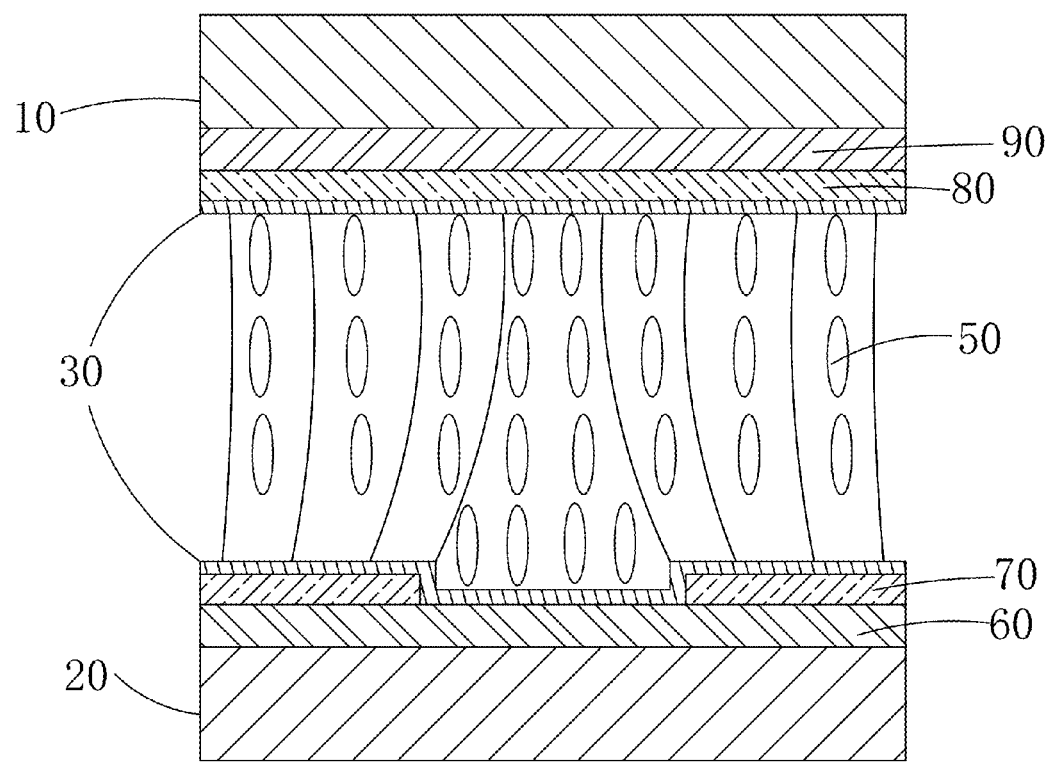
FIG. 3 is a schematic cross-sectional view of a conventional MVA-type liquid crystal display panel taken along line A-A in FIG. 2.
Figure 4:
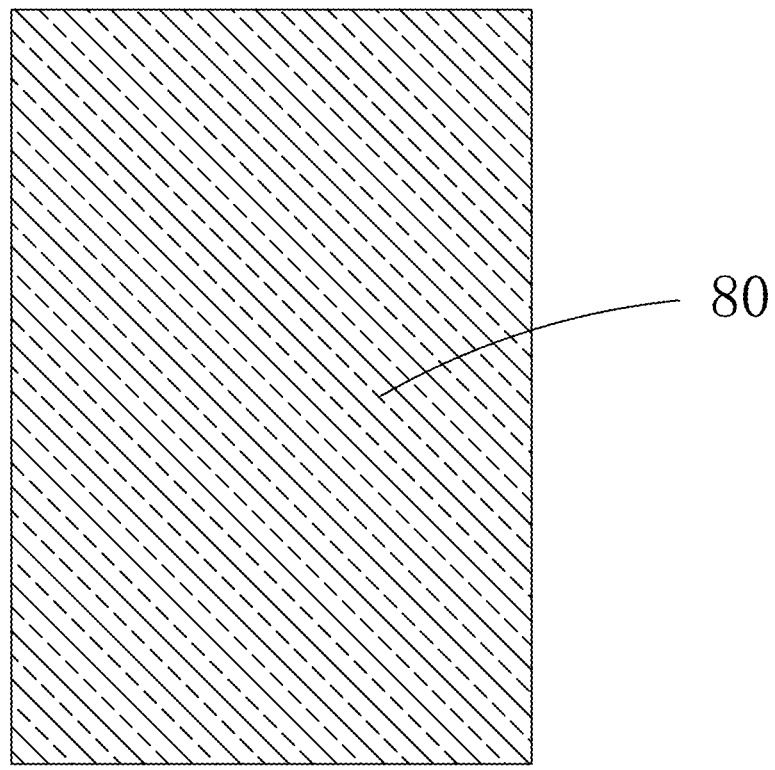
FIG. 4 is a schematic plan view of a common electrode of the MVA-type liquid crystal display panel as shown in FIG. 3.
Figure 5:
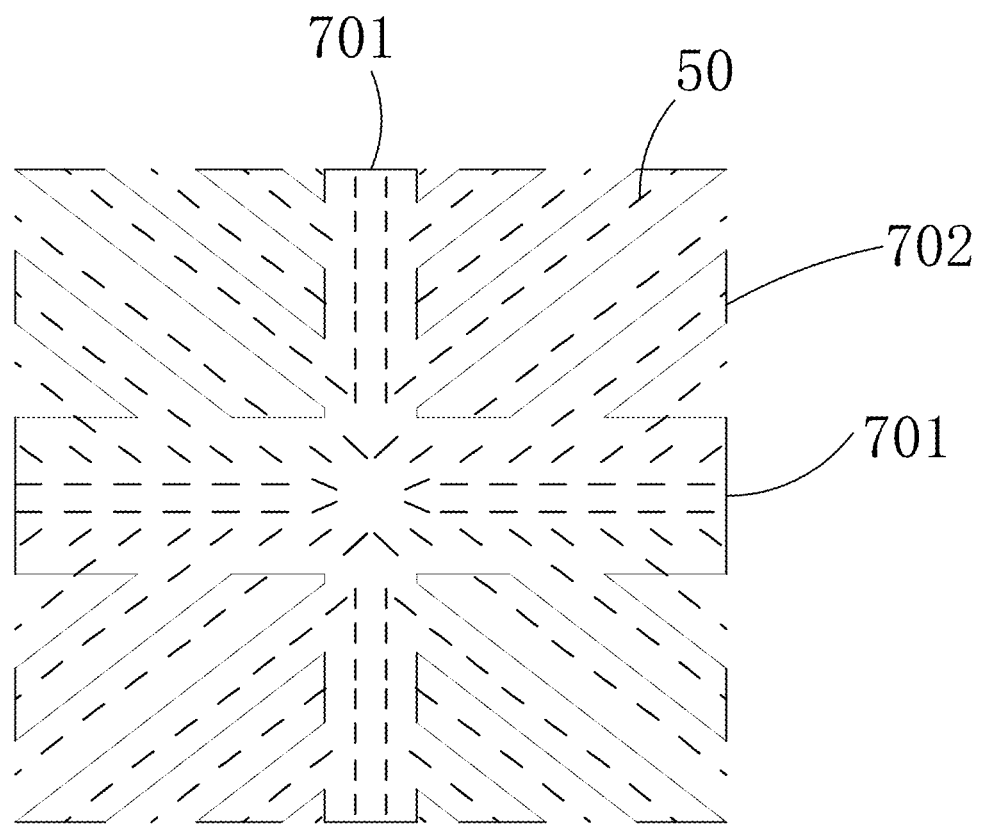
FIG. 5 is a schematic view of orientation simulation of liquid crystal molecules in the MVA-type liquid crystal display panel as shown in FIG. 3.
Figure 6:
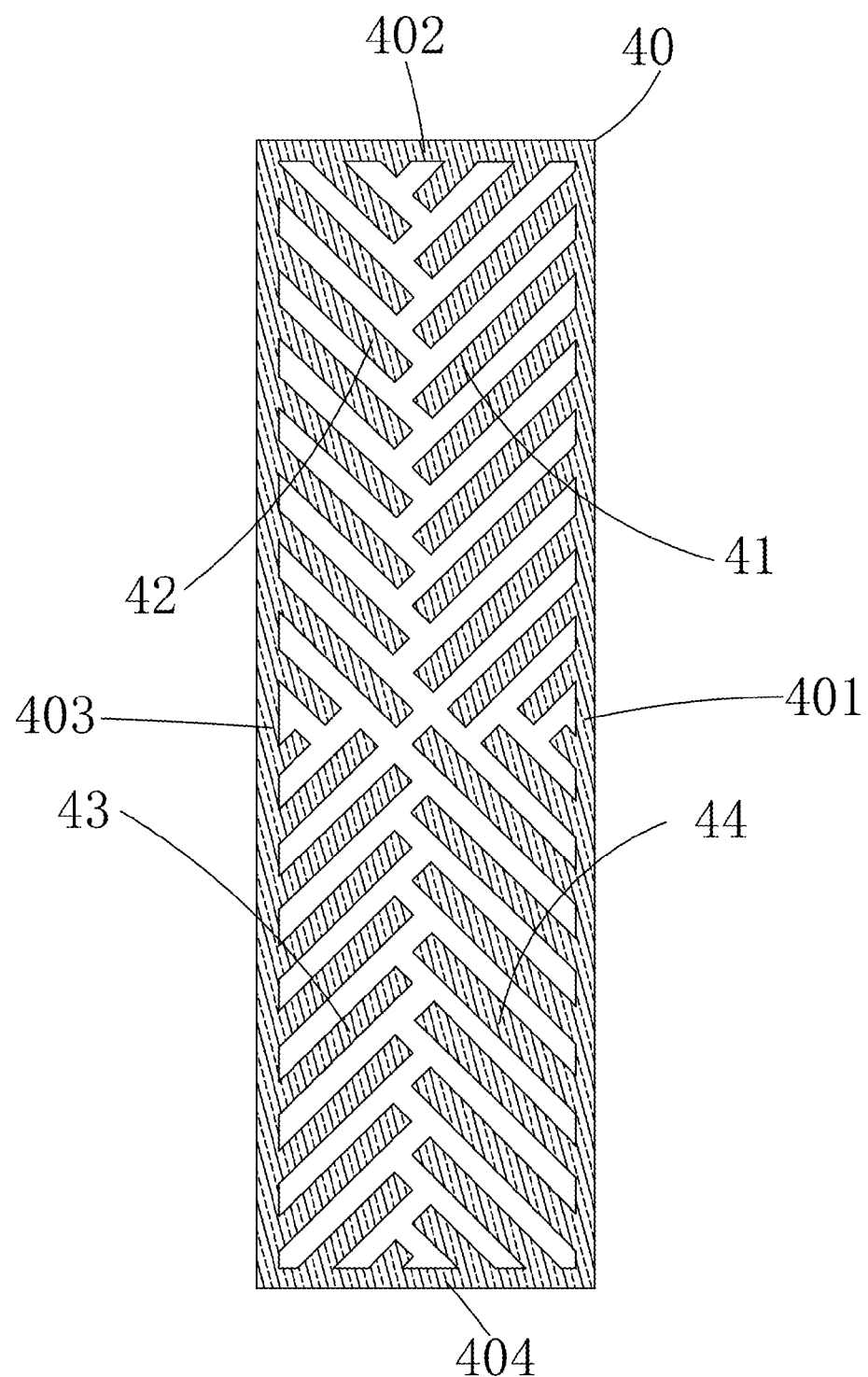
FIG. 6 is a schematic plan view of a pixel electrode of the invention.

Referring to FIG. 6, the invention firstly provides a pixel electrode. Compared with the pixel electrode in the prior art, the pixel electrode does not contain the "cross-shaped" keel structure but adopts an asymmetric structure, and specifically includes a peripheral border 40, multiple (i.e., more than one) first pixel electrode branches 41 disposed parallel to and spaced from each other, multiple second pixel electrode branches 42 disposed parallel to and spaced from each other, multiple third pixel electrode branches 43 disposed parallel to and spaced from each other, and multiple fourth pixel electrode branches 44 disposed parallel to and spaced from each other. The multiple first pixel electrode branches 41, the multiple second pixel electrode branches 42, the multiple third pixel branches 43 and the multiple fourth pixel branches 44 are all disposed in the interior of the peripheral border 40 and connected to the peripheral border 40.

The multiple first pixel electrode branches 41 and the multiple second pixel electrode branches 42 are not symmetrical with respect to a vertical centerline of the peripheral border 40 and arranged staggeredly up and down along a vertical direction. The multiple third pixel electrode branches 43 and the multiple fourth pixel electrode branches 44 are not symmetrical with respect to the vertical centerline of the peripheral border 40 and arranged staggeredly up and down along the vertical direction. The multiple first pixel electrode branches 41 and the multiple fourth pixel electrode branches 44 are not symmetrical with respect to a horizontal centerline of the peripheral border 40. The multiple second strip-shaped pixel electrode branches 42 and the multiple third strip-shaped pixel electrode branches 43 are not symmetrical with respect to the horizontal centerline of the peripheral border 40.

Concretely, the multiple first pixel electrode branches 41, the multiple second pixel electrode branches 42, the multiple third pixel electrode branches 43 and the multiple fourth pixel electrode branches 44 each have a strip shape. The multiple first strip-shaped pixel electrode branches 41, the multiple second strip-shaped pixel electrode branches 42, the multiple third strip-shaped pixel electrode branches 43 and the multiple fourth strip-shaped pixel electrode branches 44 respectively are inclined 45°, 135°, −135° and −45° with respect to the horizontal direction.

An end of any one pixel electrode branch of the multiple first pixel electrode branches 41, the multiple second pixel electrode branches 42, the multiple third pixel electrode branches 43 and the multiple fourth pixel electrode branches 44 relatively far away from the peripheral border 40 is not connected with the end of anyone of the other pixel electrode branches.

Furthermore, the peripheral border 40 has a rectangular shape. and the peripheral border 40 is a closed structure constituted by a first vertical side 401 and a second vertical side 403 both disposed along a vertical direction and a first horizontal side 402 and a second horizontal side 404 both disposed along a horizontal direction.

Inside the peripheral border 40, the multiple first pixel electrode branches 41 occupy the upper right portion, the multiple second pixel electrode branches 42 occupy the upper left portion, the multiple third pixel electrode branches 43 occupy the lower left portion, and the multiple fourth pixel electrode branches 44 occupy the lower right portion. Some of the multiple first pixel electrode branches 41 are connected to the first vertical side 401 and the rest of the multiple first pixel electrode branches 41 are connected to the first horizontal side 402. Some of the multiple second pixel electrode branches 42 are connected to the second vertical side 403 and the rest of the multiple second pixel electrode branches 42 are connected to the first horizontal side 402. Some of the multiple third pixel electrode branches 43 are connected to the second vertical side 403 and the rest of the multiple third pixel electrode branches 43 are connected to the second horizontal side 404. Some of the multiple fourth pixel electrode branches 44 are connected to the first vertical side 401 and the rest of the multiple fourth pixel electrode branches 44 are connected to the second horizontal side 404.

The pixel electrode is made of an indium tin oxide (ITO) material.

When the pixel electrode of the invention is applied to a liquid crystal display panel, the first, second, third and fourth strip-shaped pixel electrode branches 41, 42, 43, 44 respectively are corresponded to four regions of a sub-pixel. When a voltage is applied to the liquid crystal display panel, owing to that the pixel electrode of the invention does not contain the "cross-shaped" keel structure and multiple pixel electrode branches are connected by the peripheral border 40 and further the multiple pixel electrode branches form an asymmetric structure, most of liquid crystal molecules located in the middle of the pixel electrode are orientated along directions of spacings among the pixel electrode branches, i.e., are orientated along inclined angles of 45°, 135°, −45°, and −135° with respect to a horizontal direction, and $\sin^2 2\Delta\Phi$ in the transmittance formula is equal to 1, so that the liquid crystal efficiency is maximized, the transmittance is improved, and the problem of low transmittance of the liquid crystal display panel in the prior art caused by that the liquid crystal molecules located at the "cross-shaped" keel portion are orientated along the direction of 0° or 90° can be solved.

Figure 7:
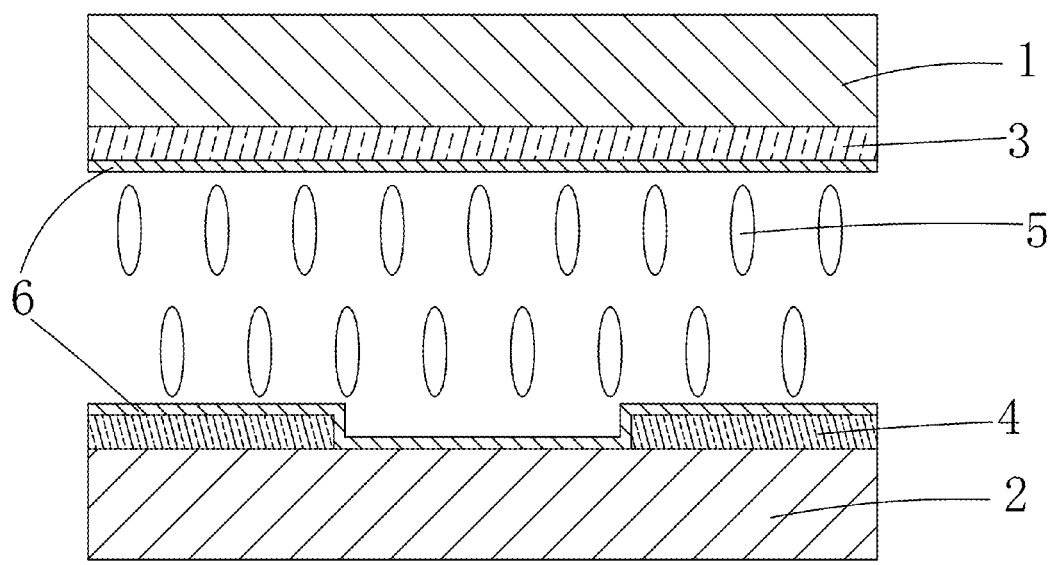
FIG. 7 is a schematic cross-sectional structural view of a liquid crystal display panel of the invention.

Based on the same inventive concept, the invention further provides a liquid crystal display panel. Please referring to FIG. 7, the liquid crystal display panel of the invention includes: an upper substrate 1, a lower substrate 2 disposed opposite to the upper substrate 1, a common electrode 3 disposed on a side of the upper substrate 1 facing toward the lower substrate 2, a pixel electrode 4 disposed on a side of the lower substrate 2 facing toward the upper substrate 1, and a liquid crystal layer 5 interposed between the common electrode 3 and the pixel electrode 4. FIG. 7 further illustrates alignment layers 6 covering the common electrode 3 and the pixel electrode 4 and for aligning the liquid crystal layer 5. Of course, the alignment layers 6 may not be disposed, and the liquid crystal layer 5 could be aligned by way of polymer-stabilized vertical alignment (PSVA) instead.

Figure 8:
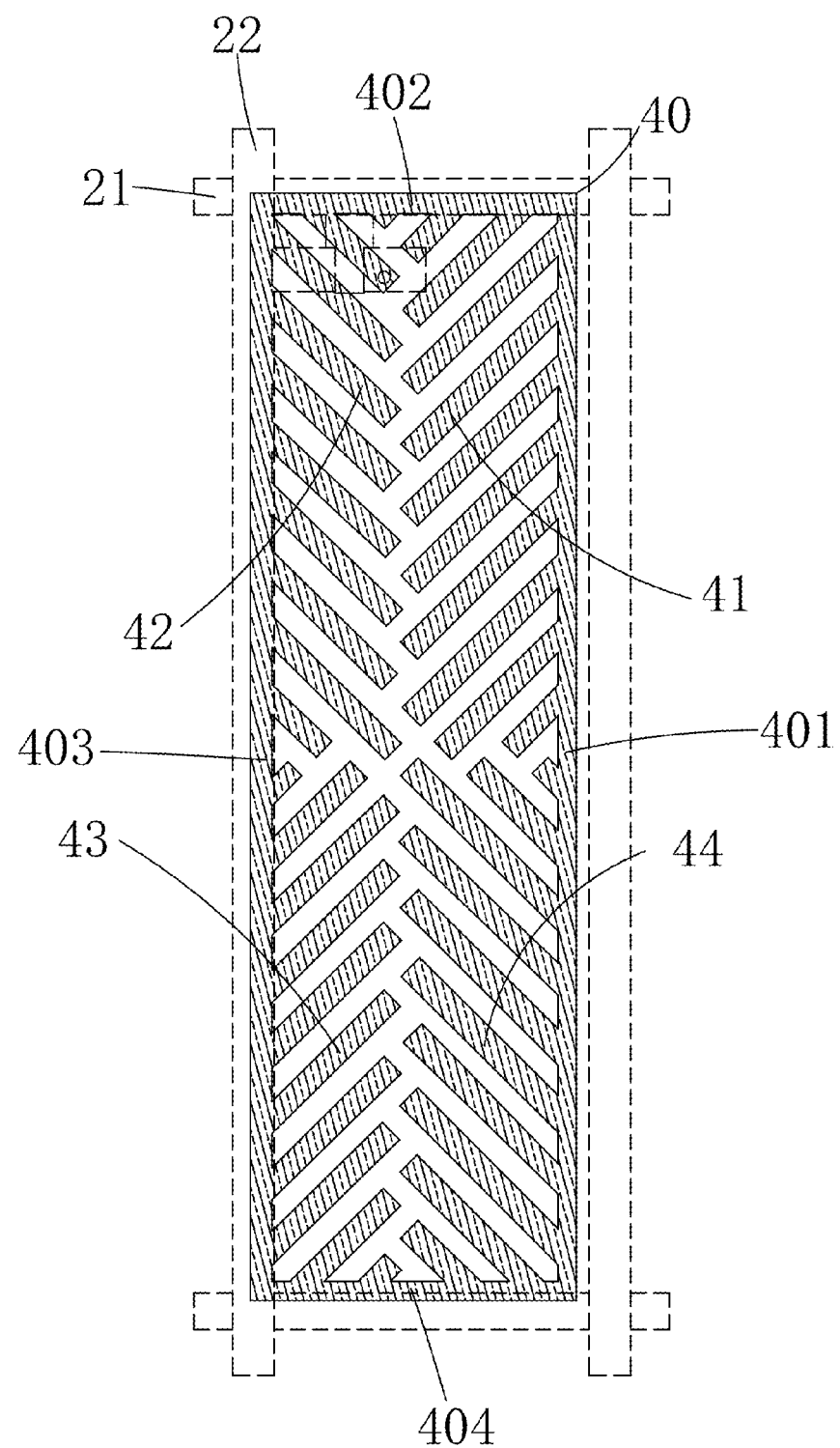
FIG. 8 is a schematic top plan view of a side of a lower substrate side of a liquid crystal display panel of the invention.

Referring to FIG. 8, the lower substrate 2 contains a gate line 21 extended along a horizontal direction, a data line 22 extended along a vertical direction and a TFT (i.e., thin film transistor). A gate of the TFT is connected to the gate line 21, a source of the TFT is connected to the data line 22, and a drain of the TFT is connected to the pixel electrode 4 by a through hole.

Compared with the pixel electrode in the prior art, the pixel electrode 4 does not contain the "cross-shaped" keel structure but employs an asymmetric structure, and particularly includes a peripheral border 40, multiple first pixel electrode branches 41 disposed parallel to and spaced from each other, multiple second pixel electrode branches 42 disposed parallel to and spaced from each other, multiple third pixel electrode branches 43 disposed parallel to and spaced from each other and multiple fourth pixel electrode branches 44 disposed parallel to and spaced from each other. The multiple first pixel electrode branches 41, the multiple second pixel electrode branches 42, the multiple third pixel branches 43 and the fourth pixel branches 44 are all disposed in the interior of the peripheral border 40 and connected to the peripheral border 40.

The multiple first pixel electrode branches 41 and the multiple second pixel electrode branches 42 are not symmetrical with respect to a vertical centerline of the peripheral border 40 and arranged staggeredly up and down along a vertical direction. The multiple third pixel electrode branches 43 and the multiple fourth pixel electrode branches 44 are not symmetrical with respect to the vertical centerline of the peripheral border 40 and arranged staggeredly up and down along the vertical direction. The multiple first pixel electrode branches 41 and the multiple fourth pixel electrode branches 44 are not symmetrical with respect to a horizontal centerline of the peripheral border 40. The multiple second strip-shaped pixel electrode branches 42 and the multiple third strip-shaped pixel electrode branches 43 are not symmetrical with respect to the horizontal centerline of the peripheral border 40.

Concretely, the multiple first pixel electrode branches 41, the multiple second pixel electrode branches 42, the multiple third pixel electrode branches 43 and the multiple fourth pixel electrode branches 44 each are strip-shaped. The multiple first strip-shaped pixel electrode branches 41, the multiple second strip-shaped pixel electrode branches 42, the multiple third strip-shaped pixel electrode branches 43 and the multiple fourth strip-shaped pixel electrode branches 44 respectively are inclined 45°, 135°, −135° and −45° with respect to the horizontal direction.

An end of any one pixel electrode branch of the multiple first pixel electrode branches 41, the multiple second pixel electrode branches 42, the multiple third pixel electrode branches 43 and the multiple fourth pixel electrode branches 44 relatively far away from the peripheral border 40 is not connected with the end of any one of the other pixel electrode branches.

Furthermore, the peripheral border 40 has a rectangular shape. The peripheral border 40 is a closed structure constituted by a first vertical side 401 and a second vertical side 403 both disposed along a vertical direction and a first horizontal side 402 and a second horizontal side 404 both disposed along a horizontal direction.

In the peripheral border 40, the multiple first pixel electrode branches 41 occupy the upper right portion, the multiple second pixel electrode branches 42 occupy the upper left portion, the multiple third pixel electrode branches 43 occupy the lower left portion, and the multiple fourth pixel electrode branches 44 occupy the lower right portion. A part of the multiple first pixel electrode branches 41 are connected to the first vertical side 401 and the remaining of the multiple first pixel electrode branches 41 are connected to the first horizontal side 402. A part of the multiple second pixel electrode branches 42 are connected to the second vertical side 403 and the remaining of the multiple second pixel electrode branches 42 are connected to the first horizontal side 402. A part of the multiple third pixel electrode branches 43 are connected to the second vertical side 403 and the remaining of the multiple third pixel electrode branches 43 are connected to the second horizontal side 404. A part of the multiple fourth pixel electrode branches 44 are connected to the first vertical side 401 and the remaining of the multiple fourth pixel electrode branches 44 are connected to the second horizontal side 404.

A material of the pixel electrode is ITO.

It is noted that the gate line 21 and the data line 22 each are at least partially overlapped with the rectangular peripheral border 40 of the pixel electrode 4, so as to make full use of an area of effective display region.

Figure 9:
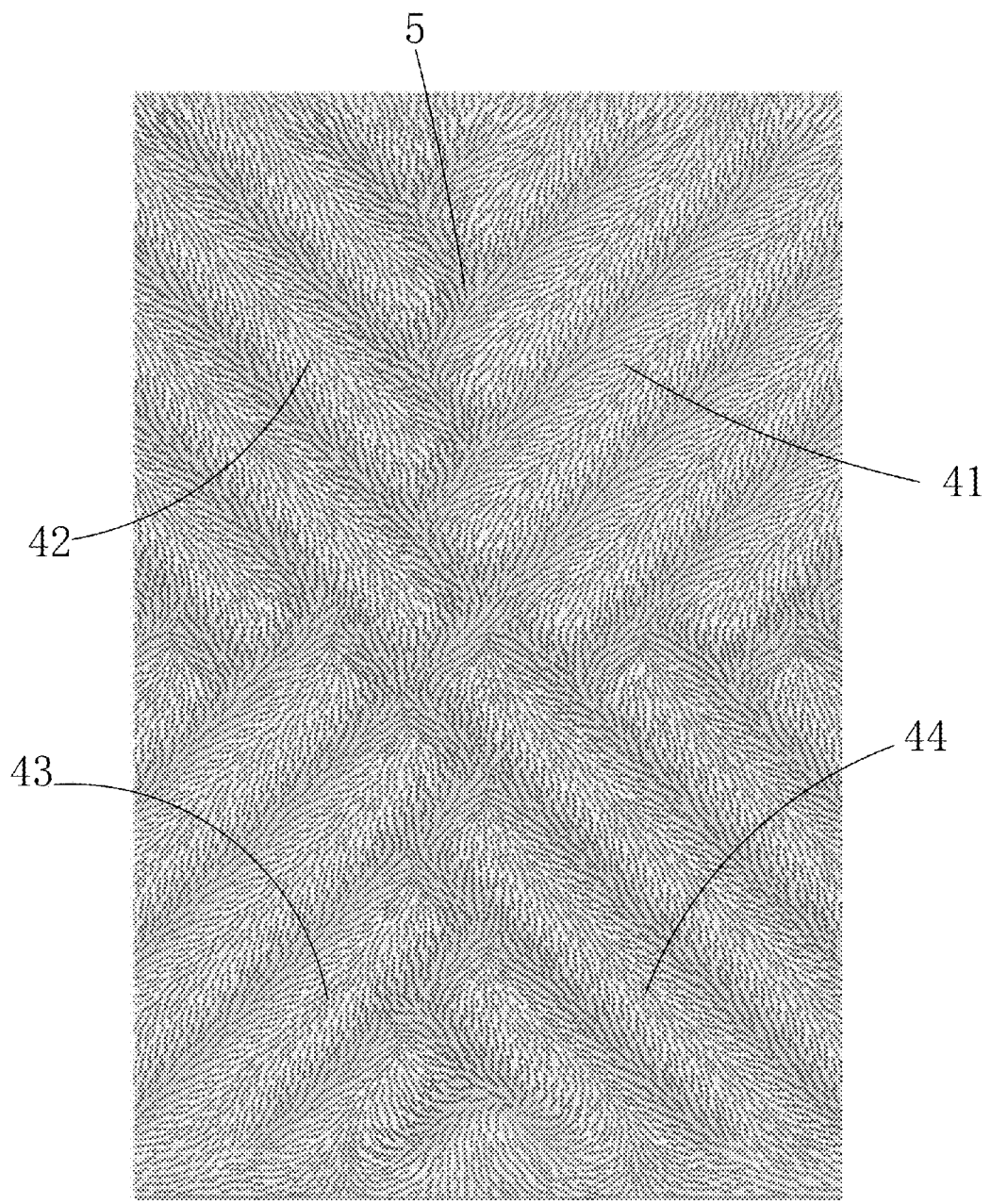
FIG. 9 is a schematic view of orientation simulation of liquid crystal molecules in a liquid crystal display panel of the invention.

In the liquid crystal display panel of the invention, the multiple first, second, third and fourth strip-shaped pixel electrode branches 41, 42, 43, 44 of the pixel electrode 4 respectively are corresponding to four regions of a sub-pixel. When a voltage is applied to the liquid crystal display panel, owing to that the pixel electrode 4 of the invention does not contain the "cross-shaped" keel and multiple pixel electrode branches are connected by the peripheral border 40 and further the multiple pixel electrode branches are arranged in a staggered manner to form an asymmetric structure, most of liquid crystal molecules located at the middle portion of the pixel electrode 4 are orientated along directions of spacings among the pixel electrode branches, i.e., are orientated/aligned along inclined angles of 45°, 135°, −45°, and −135° with respect to a horizontal direction, and $\sin^2 2\Delta\Phi$ in the transmittance formula is equal to 1, so that the transmittance of the liquid crystal display panel becomes higher, the requirement of backlight brightness becomes lower and the power consumption becomes lower. FIG. 9 is a schematic orientation simulation of liquid crystal molecules in a liquid crystal display panel of the invention, according to an estimation result, owing to the use of the pixel electrode 4, compared with the conventional liquid crystal display panel using the "cross-shaped" keel structured pixel electrode, the transmittance of the liquid crystal display panel of the invention is improved about 4%.

In summary, in regard to the pixel electrode and the liquid crystal display panel of the invention, the pixel electrode does not contain the "cross-shaped" keel structure, multiple pixel electrode branches are connected by the peripheral border and the multiple pixel electrode branches form an asymmetric structure, so that most of liquid crystal molecules located in the middle portion of the pixel electrode are orientated along directions of spacings among the pixel electrode branches, the problem of low transmittance of the liquid crystal display panel in the prior art caused by that the liquid crystal molecules located at the "cross-shaped" keel structure are improperly orientated can be solved, the transmittance of liquid crystal display panel can be increased, the requirement of backlight brightness for the liquid crystal display panel is lowered, and the power consumption is reduced.

As mentioned above, for the ordinary skill in the art, any correspondingly equivalent changes or transformations could be made according to the technical solutions and the technical ideas of the invention, but all of those changes and transformations should be similarly included within the patent scope of the claims of the invention.

What is claimed is:

1. A liquid crystal display panel comprising an upper substrate, a lower substrate disposed opposite to the upper substrate, a common electrode disposed on a side of the upper substrate facing toward the lower substrate, a pixel electrode disposed on a side of the lower substrate facing toward the upper substrate, and a liquid crystal layer interposed between the common electrode and the pixel electrode;

wherein the lower substrate has gate lines extending along a horizontal direction, data lines extending along a vertical direction, and a thin film transistor; a gate of the thin film transistor is connected to the gate line, a source of the thin film transistor is connected to the data line, and a drain of the thin film transistor is connected to the pixel electrode;

the pixel electrode comprises: a peripheral border, a plurality of first pixel electrode branches disposed parallel to and spaced from each other, a plurality of second pixel electrode branches disposed parallel to and spaced from each other, a plurality of third pixel electrode branches disposed parallel to and spaced from each other and a plurality of fourth pixel electrode branches disposed parallel to and spaced from each other; the plurality of first pixel electrode branches, the plurality of second pixel electrode branches, the plurality of third pixel branches and the plurality of fourth pixel branches all being disposed in the interior of the peripheral border and connected to the peripheral border;

the plurality of first pixel electrode branches and the plurality of second pixel electrode branches are not symmetrical with respect to a vertical centerline of the peripheral border and arranged staggeredly up and down along a vertical direction; the plurality of third pixel electrode branches and the plurality of fourth pixel electrode branches are not symmetrical with respect to the vertical centerline of the peripheral border and arranged staggeredly up and down along the vertical direction; the plurality of first pixel electrode branches and the plurality of fourth pixel electrode branches are not symmetrical with respect to a horizontal centerline of the peripheral border; the plurality of second pixel electrode branches and the plurality of third pixel electrode branches are not symmetrical with respect to the horizontal centerline of the peripheral border;

wherein the peripheral border has a rectangular shape;

wherein the peripheral border is a closed structure constituted by a first vertical side and a second vertical side both disposed along a vertical direction and a first horizontal side and a second horizontal side both disposed along a horizontal direction;

some of the plurality of first pixel electrode branches are connected to the first vertical side and the rest of the plurality of first pixel electrode branches are connected to the first horizontal side; some of the plurality of second pixel electrode branches are connected to the second vertical side and the rest of the plurality of second pixel electrode branches are connected to the first horizontal side; some of the plurality of third pixel electrode branches are connected to the second vertical side and the rest of the plurality of third pixel electrode branches are connected to the second horizontal side; some of the plurality of fourth pixel electrode branches are connected to the first vertical side and the rest of the plurality of fourth pixel electrode branches are connected to the second horizontal side;

wherein two adjacent gate lines are intersected with two adjacent data lines to form a portion, the two adjacent gate lines are a first gate line and a second gate line, the two adjacent data lines are a first data line and a second data line; the first, second, third and fourth pixel electrode branches are located between the first gate line and the second gate line; the first, second, third and fourth pixel electrode branches are further located between the first data line and the second data line; the first vertical side is neither overlapped with the first data line nor the second data line, and the second vertical side is partially overlapped with the second data line; the first horizontal side and the second horizontal side respectively are partially overlapped with the first gate line and the second gate line.

2. The liquid crystal display panel as claimed in claim 1, wherein an end of any one of the plurality of first pixel electrode branches, the plurality of second pixel electrode branches, the plurality of third pixel electrode branches and the plurality of fourth pixel electrode branches relatively far away from the peripheral border is not connected with the end of any one of the other pixel electrode branches.

3. The liquid crystal display panel as claimed in claim 1, wherein the plurality of first pixel electrode branches, the plurality of second pixel electrode branches, the plurality of third pixel electrode branches and the plurality of fourth pixel electrode branches each have a strip shape.

4. The liquid crystal display panel as claimed in claim 3, wherein the plurality of first pixel electrode branches, the plurality of second pixel electrode branches, the plurality of third pixel electrode branches and the plurality of fourth pixel electrode branches respectively are inclined 45°, 135°, −135° and −45° with respect to the horizontal direction.

5. The liquid crystal display panel as claimed in claim 1, wherein a material of the pixel electrode is ITO.

6. The liquid crystal display panel as claimed in claim 1, wherein the amount of the first pixel electrode branches connected to the first horizontal side, the amount of the second pixel electrode branches connected to the first horizontal side, the amount of the third pixel electrode branches connected to the second horizontal side and the amount of the fourth pixel electrode branches connected to the second horizontal side are identical; the identical amounts enable the vertical centerline of the peripheral border to be a straight line.

7. The liquid crystal display panel as claimed in claim 1, wherein the pixel electrode is provided in the portion surrounded by the first data line, the second data line, the first gate line and the second gate line.

* * * * *